United States Patent
Clapper

(10) Patent No.: US 6,940,958 B2
(45) Date of Patent: *Sep. 6, 2005

(54) FORWARDING TELEPHONE DATA VIA EMAIL

(75) Inventor: Edward O. Clapper, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/922,184

(22) Filed: Aug. 2, 2001

(65) Prior Publication Data

US 2003/0026402 A1 Feb. 6, 2003

(51) Int. Cl.[7] .......................... H04M 11/00; H04M 1/56
(52) U.S. Cl. ............................... 379/142.01; 379/67.1; 379/93.23; 379/142.06; 379/88.21
(58) Field of Search ............................ 379/67.1, 68–69, 379/85, 87, 88.11–88.15, 88.17, 88.19–88.23, 88.26, 93.01, 93.17, 93.23, 93.28, 142.15, 142.17, 142.01, 142.06, 93.12, 142.13, 201.03, 221.02, 265.01, 265.09, 265.12, 266.04, 266.07

(56) References Cited

U.S. PATENT DOCUMENTS

| | | | | |
|---|---|---|---|---|
| 5,706,334 A | * | 1/1998 | Balk et al. ..................... | 379/67 |
| 6,112,233 A | * | 8/2000 | Xu .............................. | 709/217 |
| 6,215,858 B1 | * | 4/2001 | Bartholomew et al. .. | 379/88.17 |
| 6,219,413 B1 | * | 4/2001 | Burg ....................... | 379/215.01 |
| 6,229,878 B1 | * | 5/2001 | Moganti ..................... | 379/67.1 |
| 6,282,275 B1 | * | 8/2001 | Gurbani et al. ............. | 379/142 |
| 6,421,425 B1 | * | 7/2002 | Bossi et al. ................... | 379/52 |
| 6,442,242 B1 | * | 8/2002 | McAllister et al. ........ | 379/67.1 |
| 6,445,694 B1 | * | 9/2002 | Swartz ....................... | 370/352 |
| 6,459,782 B1 | * | 10/2002 | Bedrosian et al. ..... | 379/201.08 |
| 6,483,898 B2 | * | 11/2002 | Lew et al. ............... | 379/88.12 |
| 6,507,643 B1 | * | 1/2003 | Groner .................... | 379/88.14 |
| 6,549,612 B2 | * | 4/2003 | Gifford et al. ............. | 379/67.1 |
| 6,621,800 B1 | * | 9/2003 | Klein .......................... | 370/282 |
| 6,650,737 B2 | * | 11/2003 | Finnigan ................. | 379/88.02 |
| 6,665,378 B1 | * | 12/2003 | Spielman et al. ........ | 379/88.12 |
| 6,671,355 B1 | * | 12/2003 | Spielman et al. ........ | 379/88.12 |
| 6,683,940 B2 | * | 1/2004 | Contractor ............... | 379/88.17 |
| 6,760,410 B1 | * | 7/2004 | Lee ............................. | 379/68 |
| 6,782,079 B2 | * | 8/2004 | Skladman et al. ........ | 379/88.13 |
| 6,792,082 B1 | * | 9/2004 | Levine ....................... | 379/67.1 |
| 6,807,409 B1 | * | 10/2004 | Davidson et al. ........... | 455/406 |
| 6,823,047 B1 | * | 11/2004 | Cruickshank ............ | 379/88.18 |

* cited by examiner

Primary Examiner—Binh K. Tieu
(74) Attorney, Agent, or Firm—Trop, Pruner & Hu, P.C.

(57) ABSTRACT

A communication such as a telephone call is received, bearing identification information such as caller ID. The received audio signals if any, is encoded and stored. The identification information is used to look up additional information about the sender of the communication, such as by using the caller ID information to search the internet, for example by doing a reverse telephone number lookup. The user is presented with a graphical representation of this, and prior, communications, such as via an html page, and can select individual communications for playback, deletion, and the like. If the user is at a remote location, the encoded communications may be forwarded to that location, such as in the form of email attachments.

20 Claims, 3 Drawing Sheets

Edward's Voicemail Page

| Date | Time | From | Phone | Address | email | website | voice mail |
|---|---|---|---|---|---|---|---|
| 04/05/01 | 12:34p | D.B. Cooper | (503) 555-1313 | 75 Columbia, Astoria OR | hijak@chute.com | www.chute.com | ▼ |
| 04/05/01 | 1:04p | Tom Li | (480) 555-2222 | --- | tli@x14.com | www.x14.com/~tli | ▼ |
| 04/06/01 | 2:30a | DAD | (480) 555-0101 | Tempe, AZ | --- | --- | 🐚 |
| 04/07/01 | 10:01a | Gear Co. | (520) 555-9900 | Flagstaff, AZ | gear@gearco.com | www.gears.com | ▼ |
| 04/11/01 | 11:11a | <private> | <private> | --- | --- | --- | ▼ |

( review deleted messages )  ( free storage space )  ( administer passwords )

Fig. 4

FORWARDING TELEPHONE DATA VIA EMAIL

RELATED APPLICATION

This application is related to U.S. patent application Ser. No. 09/921,977, entitled "Caller ID Lookup" which was filed on Aug. 2, 2001 by the same inventor and assigned to the same entity.

BACKGROUND OF THE INVENTION

1. Technical Field of the Invention

The present invention relates generally to voicemail and email, and more particularly to an apparatus and method for forwarding voicemail as email or as a web page.

2. Background Art

Caller ID allows suitably equipped telephone equipment to determine and display, at the called party's premises, the identity of the person placing a phone call, or, more specifically, the telephone number of the calling phone and usually an identification of its owner.

Speed dial and other local storage techniques are known, which allow a telephone user to store names and numbers of other people, typically those called frequently.

Some telephones have the ability to, when receiving a phone call, use the numeric caller ID information to search through such speed dial memory, such that what is displayed is the locally stored name of the caller rather than the name which the telephone company may provide as part of the caller ID info itself. For example, one's telephone may display "Dad" when he calls, rather than the name "Clapper, Robert" under which the calling telephone is subscribed to the phone company.

Computer-based voicemail systems and answering machines are known. They digitize incoming voicemail messages and store them, typically on a hard drive or in memory, for later playback by the phone's owner.

Various audio encoding techniques are known. For example, digital waveforms may be represented in .WAV files. Other encoding techniques are known, which use less storage space than .WAV files, such as MP3 technologies.

Telephone and other information lookup sites are known on the internet. For example, www.anywho.com provides the ability to not only look up a telephone number for a known name, but also the ability to do a "reverse phone book lookup" which provides the name associated with a given phone number. Other, similar services enable the lookup of street address, email address, website, and so forth, based on known names or other data.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

FIG. 4 shows one exemplary embodiment of a user interface for the apparatus.

DETAILED DESCRIPTION

Figure 1:
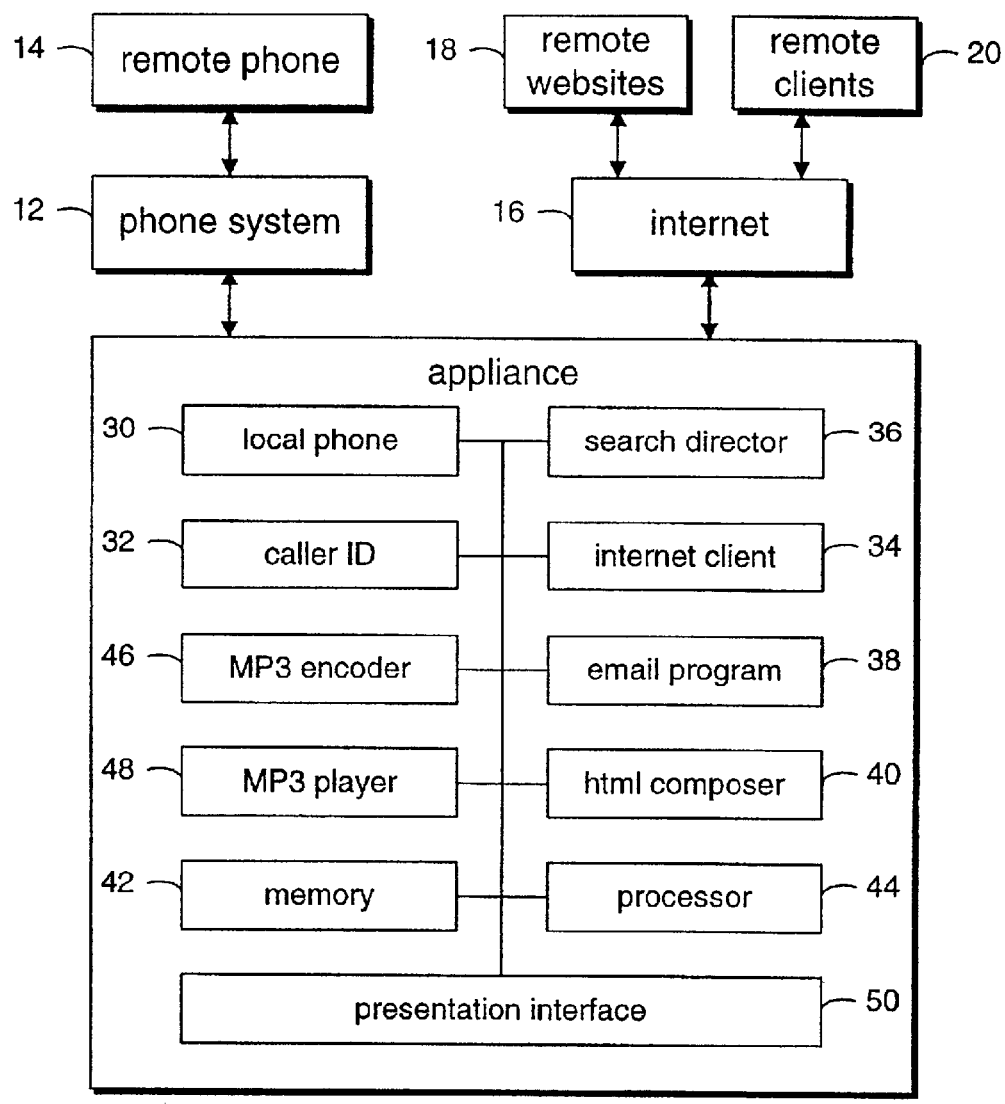
FIG. 1 shows a block diagram of one embodiment of an apparatus constructed according to the principles of this invention, and an exemplary system in which it may be used.

FIG. 1 illustrates a system 5 and one embodiment of an apparatus 10 which may be utilized in the system. The apparatus may be implemented as an appliance, in one embodiment of this invention. The system includes a phone system 12 such as the public switched telephone system, or a PBX, or a packet switched network, or any other suitable telephone system. At least one telephone ("remote phone") 14, and typically a very large number of such telephones, are connected to the telephone system. The system further includes a data network 16 ("internet") such as the internet, a local area network, a wide area network, or other such infrastructure, to which may be coupled one or many data service providers 18, generally indicated herein as "remote websites", and one or many remote email/web clients 20 which are capable of receiving email and web pages over the internet. In some instantiations, the phone system and the data system (internet) may be the same system.

The appliance of the invention is also coupled to these networks. The appliance includes a telephone mechanism 30 ("local phone") for connecting to the telephone system. It includes a caller ID mechanism 32 for receiving caller ID information from the telephone system. It includes an internet client 34 for connecting to the internet or other such data system. It also includes a search director 36 for conducting searches of the remote websites. The appliance includes an email program 38 for sending email via the internet client to one or more of the remote email clients. The appliance includes a data presentation composer 40, such as an html (hypertext markup language) composer for preparing html pages for local display or for serving to remote clients. The appliance further includes memory 42 or storage, such as a hard disk, recordable compact disc (CD-R), rewriteable compact disc (CD-RW), semiconductor memory, or other suitable storage mechanism for storing data. It also includes a processor 44 for performing logic and data manipulation operations. The appliance may include an audio encoder 46 such as an MP3 encoder, and an audio decoder or player 48 such as an MP3 player. Finally, the appliance includes a presentation interface 50, such as a video display screen and an audio speaker.

These components may be implemented in a wide variety of ways, in hardware, software, combinations thereof, and in digital or analog form. For purposes of illustration, they will be described as being implemented in a personal computer (PC) like appliance such as the Intel® Dot.Station™ appliance. The particular interconnect mechanism between them will be well within the abilities of the skilled reader, armed with this disclosure, and need not be discussed further here. The reader will understand that the components could alternatively be partitioned differently than in the illustrated example; for example, the email program, search director, and html composer could be a single piece of software. The reader will further understand that various specifics detailed above are only by way of illustration, and are not necessarily required in order to practice the invention; for example, an audio encoding technique other than MP3 could be employed.

Figure 2:
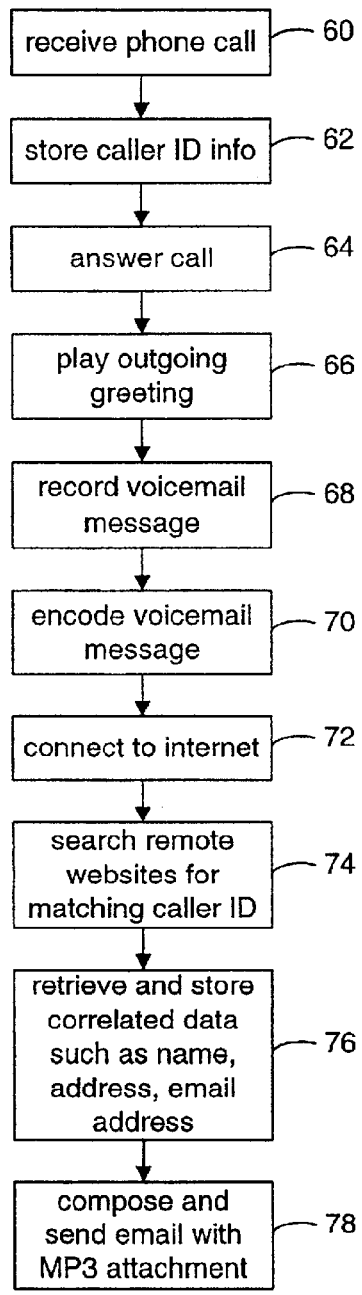
FIG. 2 shows one exemplary embodiment of a method of operation of the invention.

FIG. 2 illustrates one embodiment of a method of operation of the appliance. The appliance receives (60) a phone call from a sender, stores (62) the caller ID information which it receives with the phone call from the phone system, and answers (64) the call. The sender may be a person or a machine, and the identifying information such as caller ID may identify the person and/or the machine. In some embodiments, the appliance may include a telephone handset, allowing the user to answer the call; in such embodiments, this may abort the method of this invention. In some embodiments, the invention may be practiced in conjunction with communications other than conventional telephone calls. By way of example and not limitation, such communications might include a pager message, an instant message, a private radio call such as over the Motorola network, a voice-over-IP call, a wireless point-to-point contact, and so forth.

The appliance plays (66) an outgoing greeting announcement from the storage, typically something like "hi, I'm not here, so leave me a message". If the caller does not hang up, but begins speaking, the appliance records (68) the incoming voicemail message to the storage. In some embodiments, it may first record the message as a .WAV file, and then encode (70) it as an MP3 file. In some embodiments, the encoding may be performed on the fly, without an intermediate file being stored. In some embodiments, both versions of the voicemail message file may be kept; for example, the .WAV file may be used for local answering machine playback, while the MP3 file may be used for email and web purposes, explained below.

After receiving the caller ID information, either while the caller is leaving the voicemail message or after he or she hangs up, the appliance connects (72) to the internet using its internet client, and searches (74) one or more remote websites for other information correlated with the caller ID information, using its search director. It may search a predetermined list of websites, or it may utilize a portal, a spider, or other techniques. Upon receiving the correlated information, such as the caller's address, email address, and so forth, the appliance stores (76) this information to the storage. In some embodiments, subsequent calls from this same caller ID will not cause the internet search, as the correlated information will already be in the local storage. In some embodiments, there may be a refresh period, such that if the stored information was retrieved more than e.g. one week prior, it is re-fetched from the internet, in case some of the correlated information has changed or more correlated information is now available.

In some embodiments, the appliance may then compose and send (78) an email to one or more predetermined email addresses, with the voicemail audio file included e.g. as an attached file. In some such embodiments, the user may have specified a single email address to which all voicemails should be forwarded; such embodiments would be useful, for example, if the user is going to his summer home (where he has an email connection but no phone) for a week but needs to continue receiving his voicemail.

Figure 3:
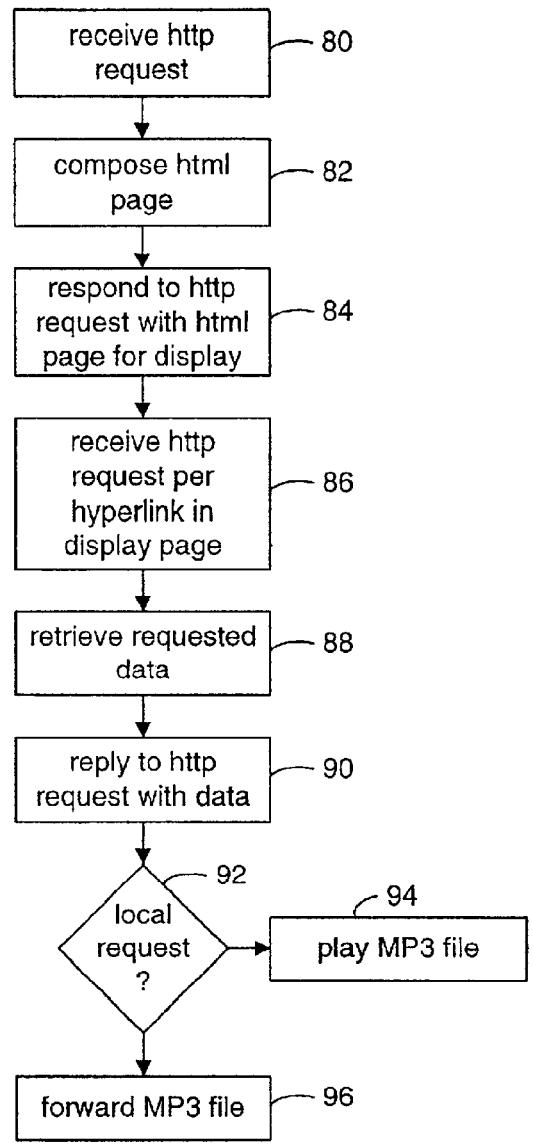
FIG. 3 shows another exemplary embodiment of a method of operation of the invention.

FIG. 3 illustrates one embodiment of a method of further operation of the appliance. The appliance receives (80) a request from one of the remote email/web clients or perhaps directly at the local internet client's browser, such as an http request for a web page to contain the requester's voicemail. In some embodiments, the appliance may authenticate the requester, for security purposes. The appliance's html composer constructs (82) a web page, such as in the form of a table, using data which has been placed in storage (in accordance with the method of FIG. 2) and the internet client responds (84) to the http request by sending the web page which the html constructor has built (either to the remote email/web client or to the local presentation interface). In some embodiments, this may be performed using a secure transport mechanism such as https.

In some embodiments, the web page constructed may include one or more hyperlinks, and the remote user may make further requests via those hyperlinks. If he or she does, the appliance receives (86) the request such as in the form of a further http request, retrieves (88) additional data from the storage, and replies (90) to the request by forwarding the hyperlinked data. One such hyperlinked data item may be the voicemail message itself. If (92) the request for the hyperlinked voicemail message is made locally, at the appliance, the appliance's MP3 player plays (94) the voicemail on the local speaker. Otherwise, if the request is from a remote email/web client, the appliance's internet client forwards (96) the MP3 file to the remote device, where it will be decoded and played for the remote user. Alternatively, if the request is from a remote device that does not have the ability to decode or playback the file, the appliance may decode it locally and output e.g. an analog waveform or a .WAV file to the remote device.

The reader will appreciate that these are but exemplary implementations of such methods, and that various changes may be made to the particulars and ordering of the methods, within the scope of this invention. The reader will further appreciate that additions may be made, such as deleting old or listened-to voicemail files.

FIG. 4 illustrates one exemplary embodiment of a voicemail interface web page which may be constructed by the html composer. The information is shown as being presented in tabular format, but other formats are certainly possible and within the scope of this invention. The voicemail interface web page may include entries for each of the voicemail messages received, or perhaps for a subset, as in the case where there are too many to show on a single page. The presented data might include, for example, the date and time when the call was received, the phone number from which the call was placed (unless caller ID information was not made available for that call), the name of the caller if the internet or local lookup was successful, and other such information such as street address, email address, uniform resource locator (URL) of the caller's website, and so forth.

The voicemail message itself is made available through this interface page. One method of making it available is to include a hyperlinked icon. In the example shown, the symbol "📢" indicates a new voicemail message, and the symbol "🔊" indicates a voicemail message to which the user has previously listened. Alternatively, the voicemail message could be made available as a hyperlinked URL, or as an Active-X control, or through any other suitable mechanism.

Additionally, the voicemail interface web page may include additional items, such as control buttons for reviewing previously deleted messages which may be held in a "recycle bin" in the storage, or for freeing up storage space by emptying the recycle bin, or for administering passwords or other controls. It may include further controls (not shown), such as for paging to the next subset of voicemail messages, changing the default email-to address, changing the MP3 recording datarate/quality setting, setting passwords on individual files, hiding all calls from a particular caller ID unless an administrator password is provided, automatically deleting (or not recording) voicemail from a specified list of callers, and so forth.

The reader should appreciate that drawings showing methods, and the written descriptions thereof, should also be understood to illustrate machine-accessible media having recorded, encoded, or otherwise embodied therein instructions, functions, routines, control codes, firmware, software, or the like, which, when accessed, read, executed, loaded into, or otherwise utilized by a machine, will cause the machine to perform the illustrated methods. Such media may include, by way of illustration only and not limitation: magnetic, optical, magneto-optical, or other storage mechanisms, fixed or removable discs, drives, tapes, semiconductor memories, organic memories, CD-ROM, CD-R, CD-RW, DVD-ROM, DVD-R, DVD-RW, Zip, floppy, cassette, reel-to-reel, or the like. They may alternatively include down-the-wire, broadcast, or other delivery mechanisms such as Internet, local area network, wide area network, wireless, cellular, cable, laser, satellite, microwave, or other suitable carrier means, over which the instructions etc. may be delivered in the form of packets, serial data, parallel data, or other suitable format. The machine may include, by way of illustration only and not limitation: microprocessor, embedded controller, PLA, PAL, FPGA, ASIC, computer, smart card, networking equipment, or any other machine, apparatus, system, or the like which is adapted to perform functionality defined by such instructions or the like. Such drawings, written descriptions, and corresponding claims may variously be understood as representing the instructions etc. taken alone, the instructions etc. as organized in their particular packet/serial/parallel/etc. form, and/or the instructions etc. together with their storage or carrier media. The reader will further appreciate that such instructions etc. may be recorded or carried in compressed, encrypted, or otherwise encoded format without departing from the scope of this patent, even if the instructions etc. must be decrypted, decompressed, compiled, interpreted, or otherwise manipulated prior to their execution or other utilization by the machine.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

What is claimed is:

1. A method comprising:
   receiving a communication from a sender on a first processor-based system, the communication including an incoming audio message for storage and sender identification information;
   connecting to the Internet to search one or more remote websites for information correlated with the sender identification information;
   creating a second communication on the first processor-based system, the second communication including the stored audio message and sender identification information; and
   selectively sending the second communication to a local presentation interface or to a remote client, if sending to a remote client sending over the Internet.

2. The method of claim 1 further including storing the sender identification information and the correlated information received from a remote website.

3. The method of claim 2 wherein creating a second communication includes creating the second communication using the stored information.

4. The method of claim 1 wherein creating a second communication includes creating an email, the email to include the stored audio message as an attachment.

5. The method of claim 1 wherein creating a second communication includes creating a hypertext markup language page, the hypertext markup language page including a hyperlink to the stored audio message.

6. The method of claim 5 including receiving a request for the audio message, the audio message to be forwarded as an MP3 file.

7. The method of claim 1 further including displaying the second communication on said first processor-based system.

8. The method of claim 1 including receiving a subsequent communication from the same sender, and determining if a preset time period has expired.

9. The method of claim 8 including in response to the expiration of the preset time, connecting to the Internet to search one or more remote websites for changes in the correlated information, and if there is no change retrieving the correlated information from storage.

10. A personal computer-like appliance comprising:
    a telephone mechanism to connect said appliance to a network and to receive a communication from a sender, the communication including an incoming audio message to be recorded and sender identification information;
    a composer to compose a second communication capable of being sent via the Internet, the second communication to include the recorded audio message and sender identification information; and
    a presentation interface for said appliance to display the second communication.

11. The personal computer-like appliance as defined in claim 10 further comprising:
    an Internet client to selectively transmit the second communication to a remote client.

12. The personal computer-like appliance as defined in claim 10 further comprising:
    a search director to search a remote website using the sender identification information, for correlated information related to the sender.

13. The personal computer-like appliance as defined in claim 12 further comprising:
    a memory to store the audio message, the sender identification information and the correlated information.

14. An article storing machine-readable instructions that, if executed, enable a first processor-based system to:
    receive a communication from a sender, the communication to include an incoming audio message for storage and sender identification information;
    connect to the Internet to search one or more remote websites for information correlated with the sender identification information;
    create a different communication on said first processor-based system, the different communication to include the stored audio message and the sender identification information; and selectively send the different communication to a local presentation interface for the first processor-based system, or over the Internet to a remote client.

15. The article of claim 14 storing machine-readable instructions, that if executed, enable the first processor-based system to store the sender identification information and the correlated information received from a remote website.

16. The article of claim 15 storing machine-readable instructions, that if executed, enable the first processor-based system to create a communication using the stored information.

17. The article of claim 14 storing machine-readable instructions, that if executed, enable the first processor-based system to create an email, the email to include the stored audio message as an attachment.

18. The article of claim 14 storing machine-readable instructions, that if executed, enable the first processor-based system to create a hypertext markup language page, the hypertext markup language page including a hyperlink to the stored audio message.

19. The article of claim 18 storing machine-readable instructions, that if executed, enable the first processor-based system to receive a request for the audio message, the audio message to be forwarded as an MP3 file.

20. The article of claim 14 storing machine-readable instructions, that if executed, enable the first processor-based system to display the different communication.

* * * * *